US008650646B2

(12) United States Patent
Rubin et al.

(10) Patent No.: US 8,650,646 B2
(45) Date of Patent: Feb. 11, 2014

(54) SYSTEM AND METHOD FOR OPTIMIZATION OF SECURITY TRAFFIC MONITORING

(75) Inventors: Andrey S. Rubin, Moscow (RU); Ivan N. Golenkov, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 13/553,665

(22) Filed: Jul. 19, 2012

(65) Prior Publication Data

US 2013/0305365 A1    Nov. 14, 2013

(30) Foreign Application Priority Data

May 11, 2012   (RU) .................................. 2012118995

(51) Int. Cl.
*G06F 21/00* (2013.01)
(52) U.S. Cl.
USPC ............. 726/23; 709/227; 709/228; 715/734; 715/735; 380/2
(58) Field of Classification Search
CPC ............ H04L 63/1408; H04L 63/0227; H04L 63/1433; H04L 63/04; H04L 63/1416; H04L 63/1425; G06F 21/55; G06F 21/60; G06F 21/554; G06F 21/56; G06F 21/577; G06F 21/566
USPC ............... 726/23, 22; 709/227, 228; 715/734, 715/735; 380/2
See application file for complete search history.

(56) References Cited

U.S. PATENT DOCUMENTS

| | | | |
|---|---|---|---|
| 2004/0025044 A1* | 2/2004 | Day .............................. | 713/200 |
| 2005/0216770 A1* | 9/2005 | Rowett et al. ................. | 713/201 |
| 2007/0056029 A1* | 3/2007 | Kay ................................ | 726/11 |
| 2007/0113281 A1* | 5/2007 | Leach ............................ | 726/22 |
| 2008/0201772 A1* | 8/2008 | Mondaeev et al. ............. | 726/13 |
| 2011/0066585 A1* | 3/2011 | Subrahmanyam et al. ..... | 706/52 |
| 2012/0185945 A1* | 7/2012 | Andres et al. .................. | 726/25 |
| 2012/0210429 A1* | 8/2012 | Stute ............................. | 726/23 |
| 2013/0031633 A1* | 1/2013 | Honig et al. .................... | 726/23 |

* cited by examiner

*Primary Examiner* — Jason K. Gee
*Assistant Examiner* — Sharif E Ullah
(74) *Attorney, Agent, or Firm* — Bardmesser Law Group

(57) ABSTRACT

A method and system for security processing of a network data stream. Threat-related statistics are collected and the network data stream is selectively checked based on the statistics data identifying the areas of the stream where the threats had been previously detected. A system for processing a network data stream includes at least one network Intrusion Detection System (IDS) for checking a pre-determined portion of the data stream for presence of threats. The IDS collects threat-related statistics and provides it to statistics database. A unit for determining areas of the data stream to be checked queries the statistics database for determining or changing the current checked area based on the received statistics. The information about changes in the areas of the data stream to be checked is provided to the IDS, which checks the selected areas of the data stream.

22 Claims, 6 Drawing Sheets

SYSTEM AND METHOD FOR OPTIMIZATION OF SECURITY TRAFFIC MONITORING

CROSS-REFERENCE TO RELATED APPLICATION

The present application claims priority to Russian Patent Application No. 2012118995, filed May 11, 2012, which is incorporated herein by reference in its entirety.

BACKGROUND OF THE INVENTION

1. Field of the Invention

The present invention is related to methods and systems for protection against network threats and, in particular, to a method and system for optimization of network traffic monitoring for presence of threats.

2. Description of the Related Art

Recently, the number of computer threats has drastically increased. For example, malware applications, such as computer viruses, network worms, Trojans, as well as malicious attacks, have become very common. Subsequently, Intrusion Detection Systems (IDSs) have been developed and are widely used for protection of networks and individual computer systems.

The IDSs include hardware and software means intended for analyzing network (or computer system) events in order to detect attacks against vulnerable systems or services (applications). The IDSs also detect instances of unauthorized access. A typical IDS intercepts incoming traffic (i.e., transmitted network data) and analyzes it for presence of threats. Typically, the threats are detected using heuristic rules and signature analysis (using pre-stored signatures of known threats).

A conventional architecture of a network IDS is shown in FIG. 1. Network traffic is intended for computer systems 111 located within a LAN 110. The network traffic is analyzed for presence of threats by a network IDS 100. If the threats are detected by the IDS 100, the IDS 100 can block (entirely or partially) transmission of the traffic data to the computer systems 111.

If the traffic data is blocked partially, only a portion of the traffic data deemed clean by the IDS 100 is passed on to the computer systems 111. However, if the IDS 100 (using heuristic analysis) cannot produce a definitive verdict regarding the safety of the traffic data, the traffic data can be passed on along to the recipients with a warning about the presence of suspicious components within the traffic data. Alternatively, the IDS 100 can be implemented on each computer system 111 and can perform analysis of the network traffic coming into this computer system.

As speed of network connections increases and as the number of threats grows daily, modern IDSs have to analyze larger volumes of network traffic data using growing signature databases and large sets of heuristic rules. This creates significant delays in delivering the traffic data to a recipient. The delay is directly connected to traffic analysis.

There are a number of solutions intended for optimization of traffic security processing and increasing productivity of the IDSs. For example, U.S. Pat. No. 7,617,533 discloses a system for detection of network attacks based on signature analysis of the network traffic performed at a network switch or a router. In order to optimize the process, only a portion of the incoming network traffic is analyzed.

U.S. Pat. No. 7,950,059 describes a method for detecting malware in a data stream. Only part of the data stream deemed suspicious is checked for malware. The part of the data stream is deemed suspicious based on the presence of illegal character in a protocol of the data stream.

U.S. Patent Publication No. 20100077482 describes a method for malware code detection in a data stream transmitted over network. In order to speed up data processing, a special list containing samples of malware codes and information about portions of the data stream that may contain malware code is generated. Based on the information contained in the list, only portions of the data stream are checked.

U.S. Pat. No. 7,535,909 discloses a method for processing network packets, where a size of a filtering window changes according to packet size. If the packet size is smaller than a size of a filtering window, the size of the window is reduced to the size of the packet. A minimal size of the packets to be checked is set, and the packets with the size below the minimal size are let through without checking. Thus, the filtering window adjusts to the packet size, and the packets with small sizes are excluded from checking, which speeds up overall processing of the packets.

The above described solutions allow for speeding up network traffic processing. However, a desired level of reliability is not provided. In particular, if a new network threat is introduced, it can go undetected within a data stream, with a high probability.

U.S. Patent Publication No. 20070179935 describes a method of detecting malware code within a network data stream. The data stream is checked inside a window of a pre-set size using a number of checking modules. Each module checks a portion of a code against signatures of a certain size. Then, the window is shifted based on the result of comparison for further checking. This solution increases reliability of checking of the network traffic, but requires checking of the entire stream. Thus, the efficiency of the proposed method is low.

Accordingly, there is a need in the art for a system and method for efficient and reliable security processing of the network traffic.

SUMMARY OF THE INVENTION

The present invention is related to protection against computer and network threats. The present invention provides a method, system and computer program product for optimization of network traffic security monitoring that substantially obviates one or several of the disadvantages of the related art.

In one aspect of the invention, a method for reducing network traffic security processing time without compromising reliability is provided. Threat-related statistics are collected and the network data stream is selectively checked based on the statistics identifying the areas of the data stream where the threats had been previously detected. According to an exemplary embodiment, a system for processing a network data stream includes at least one network Intrusion Detection System (IDS) for checking a pre-determined portion(s) of the data stream for presence of threats. The IDS collects threat-related statistics and provided it to a statistics database.

A unit for determining areas of the data stream to be checked queries the statistics database for determining or changing the currently checked area based on received threat statistics. The information about changes in the areas of the stream to be checked is provided to the IDS. Threat-related statistics can include data reflecting an off-set value (i.e., location) of the detected threat from the beginning of the data stream and a time of the threat detection. The area determination unit changes the area to be checked, so that the checked area includes the off-sets of all detected threats. The area determination unit can also change the checked area, so that the checked area of the data stream includes only the off-sets of the threats that have been detected within a certain time period.

According to the exemplary embodiment, the IDS can check the entire data stream and provide the threat-related statistics to the database. The IDS can also serve as a "bait" for the intruders. The area determination unit can also widen the checked area within certain boundaries. The area determination unit can also change the checked area periodically. The area determination unit changes the checked area upon receiving data indicating new threats from the statistics database. The area determination unit can determine several checked areas for detecting threats with various off-sets.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for checking network data stream for presence of threats is provided. The method includes determining an area of the data stream to be checked; checking the area of the data stream for threats; collecting statistics related to detected threats; and changing the area to be checked based on the collected threat-related statistics.

According to one exemplary embodiment, the threat-related statistics include the off-set value of each threat relative to the beginning of the data stream and the detection time for each threat. According to another exemplary embodiment, the area to be checked is changed so it includes the off-sets of all detected threats. According to yet another exemplary embodiment, the checked area is changed so it includes only the off-sets of the threats detected within a certain time period. Additionally, the entire data stream can be check for threats.

According to one exemplary embodiment, the checked area is increased within certain boundaries. According to another exemplary embodiment, the checked areas are changed periodically or upon expiration of a certain time period. Alternatively, the checked areas of the data stream are re-set upon detection of a new threat. Additionally, several checked areas for detecting threats with various off-sets can be determined.

Figure 1:
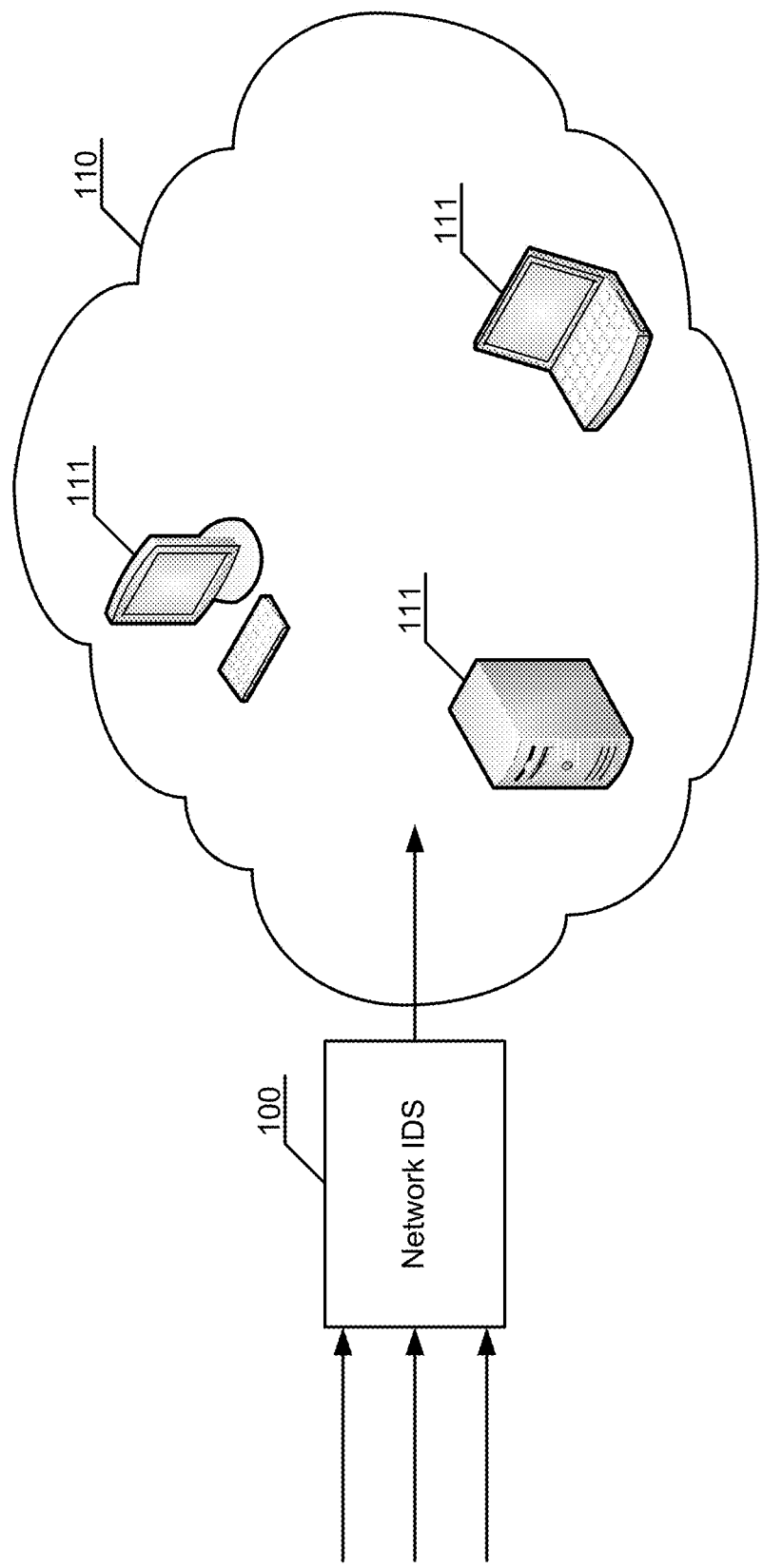
FIG. 1 illustrates a conventional system for network intrusion detection.
Figure 2A:
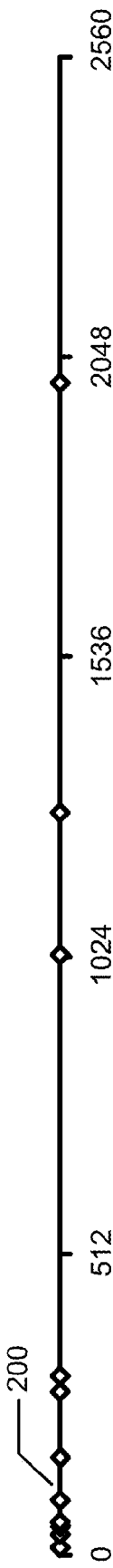
FIG. 2A illustrates an exemplary distribution of threats within a network data stream.

FIG. 2A illustrates an exemplary distribution of threats within a network data stream. The diamond-shaped dots with numbers illustrate the off-sets of the exemplary network threats within the data stream 200 relative to the beginning of the data stream. The threats have an arbitrary (uneven) distribution with most of the threats found in the beginning of the data stream. In order to optimize security processing of the data stream, only the portions (areas) of the data stream where the threats are more likely to be found are checked.

Figure 2B:
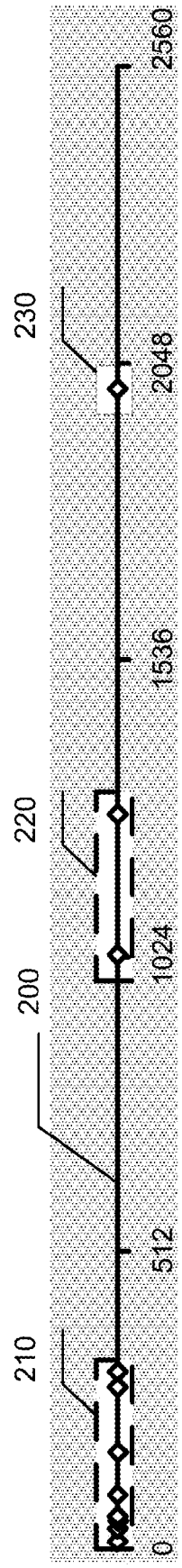
FIGS. 2B-2C illustrate a method for partial checking of a data stream, in accordance with the exemplary embodiment.
Figure 2C:
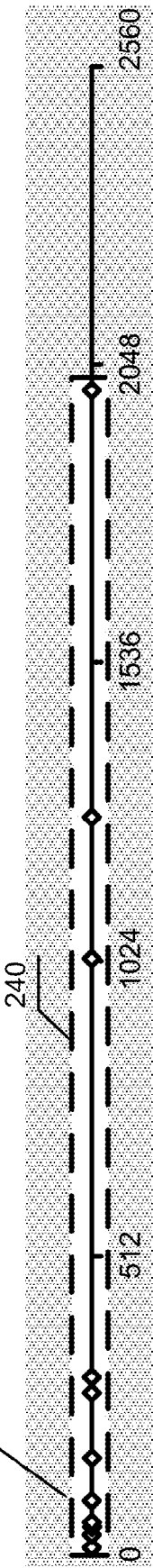

FIG. 2B illustrates a method for partial checking of a data stream, in accordance with the exemplary embodiment. According to this method, only the portions (areas) 210, 220 and 230 of the data stream 200, where the threats are more likely to be found, are checked. Another exemplary method of partial checking of the data stream is illustrated in FIG. 2C. According to this method, the first portion 240 of the data stream 200 is checked. The size of the checked portion 240 of the data stream 200 is selected in such a way that all possible threats are located within this portion of the data stream.

While partial checking of the network data stream saves times and resources, selection of locations and sizes of checked areas can be complicated. New types of threats appear daily, and some of these threats can be located outside of the pre-determined checked areas. Thus, some of the threats can be missed by a conventional network IDS. Additionally, some threats that were taken in consideration for determining locations and sizes of the checked areas can become outdated (i.e., the threats are no longer used by intruders). Then, effectiveness of the network IDS can decrease, because the IDS uses its resources for checking the areas of the data stream that do not contain any relevant threats.

Figure 3:
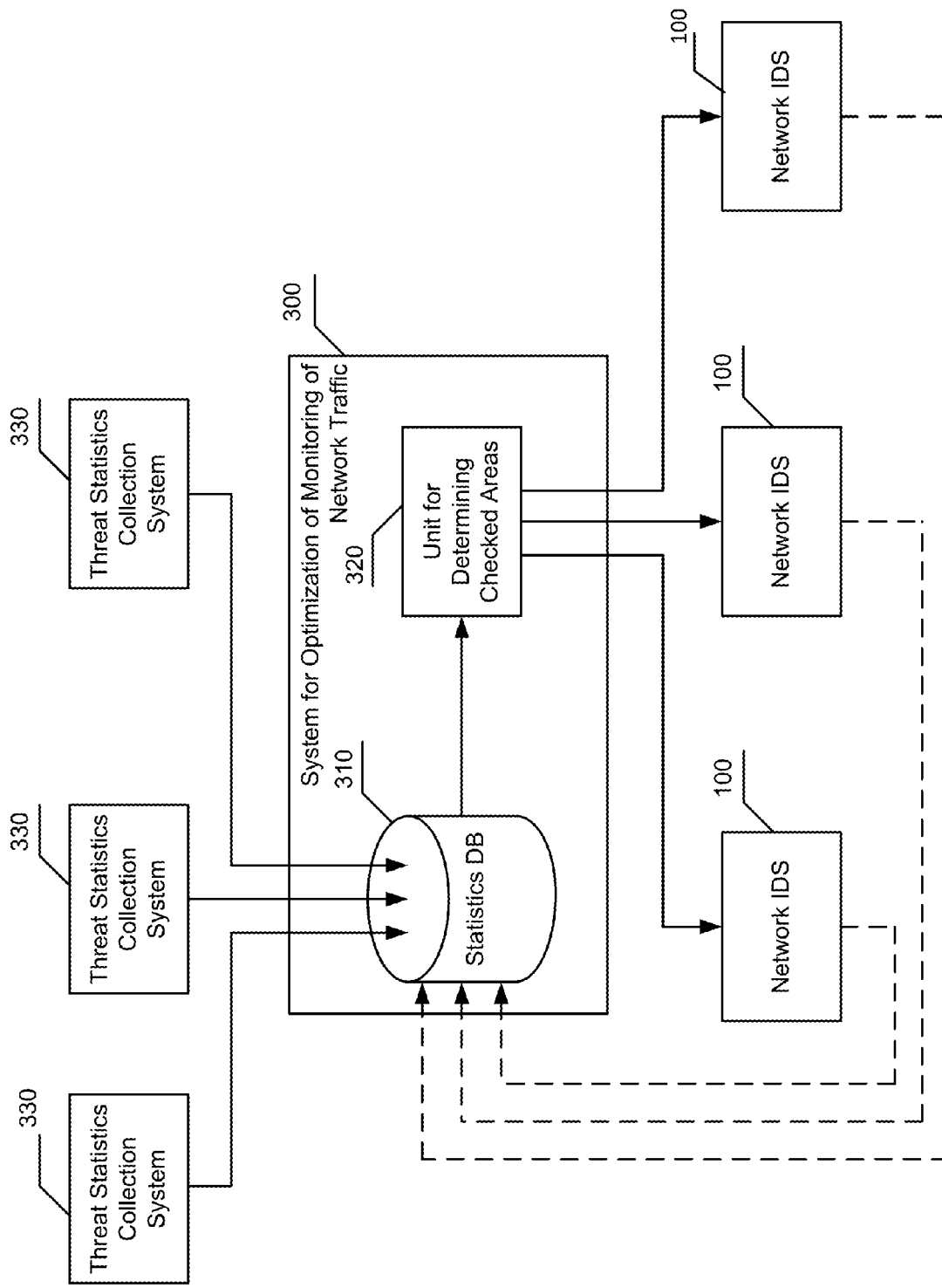
FIG. 3 illustrates a system for optimization of security processing of network traffic data, in accordance with the exemplary embodiment.

An optimization system for processing the network traffic, in accordance with the exemplary embodiment, solves the above-mentioned problems. FIG. 3 illustrates a system for optimization of security processing of network traffic data, in accordance with the exemplary embodiment. The exemplary system includes network IDSs 100 capable of performing partial checks of the network traffic. The IDSs 100 are connected to a traffic monitoring optimization system 300 that includes statistics database 310 and a unit 320 for determining checked areas of the network data stream.

Threat-related statistics collection systems 330 collect the statistics based on detected threats and provide the statistics data to the database 310. In general, the systems 330 and the IDSs 100 are connected to each other through the system 300. The system 300 itself can be implemented, for example, as a cloud-based service. In this case, the statistics collection systems 330 transmit the statistics to the cloud, where the checked areas are determined, and are then transmitted to the client systems, where the IDSs 100 are located. Modules 100 and 330 can be connected to the system 300 using any known means, such as wireless or wired connections used to implement network connectivity, LANs, WANs, etc. As an alternative embodiment, the system 300 can be located on a separate server which is part of a local network, and the modules 100 and 330 are also located within the local network. Modules 100 and 330 can be implemented both in hardware and/or software. Note that an optimization system can have an arbitrary number of the IDSs 100 and statistics collection systems 330.

The threat statistics collection systems 330 are implemented as network IDSs that perform full check of the network traffic in order to collect data reflecting the locations of threats within the data stream. In theory, the threat can be located anywhere in the data stream, however, in practice, the absolute majority of the threats are located in the beginning of the stream, as shown in FIG. 2A, which is based on real statistics. The processing involves working with objects described in the OSI stack. The threat statistics collection systems 330 provide the off-sets of the detected threats and times of detection to the statistics database 310 of the traffic monitoring optimization system 300.

According to one exemplary embodiment, the systems 330 can be implemented as IDSs that not only perform full check of the network traffic, but also have a special function for sending the threat-related data to the database 310. According to another exemplary embodiment, the systems 330 can be implemented as special traps—resources serving as a bait to intruders (i.e., "honeypots").

According to the exemplary embodiment, the unit for determining the checked areas 320 calculates an age value for each of the threats recorded in the database 310. The threat age value is calculated as a difference between a current time and the threat detection time. Then, the threat ages are compared against an age threshold. Subsequently, the checked areas are set by the unit 320 for partial check of the data stream in such a way that the checked area includes only the off-sets of the threats with ages below the age threshold.

According to the exemplary embodiment, the areas to be checked can be determined by the unit 320 periodically, upon expiration of a certain time period, or upon entry of new threat statistics into the database 310. According to one exemplary embodiment, the unit 320 does not take the threat age into consideration and performs determination of the areas to be checked based on off-sets of all detected threats recorded in the database 310.

According to yet another exemplary embodiment, threat off-set data and threat detection time is provided to the database 310 by the IDSs 100. After the areas to be checked are determined by the unit 320, the area-related information is passed on to the IDSs 100. Then, the IDSs 100 check only areas of the data stream determined by the unit 320. In order to detect new types of threats having off-sets located outside of the areas checked by the IDSs 100, the checked area boundaries can be widened within certain limits. For example, considering FIG. 2A again, a typical area can be set to about 1.5 MB. Expanding the area by 0.5 MB will "capture" the last threat, which is not included in the original area.

For example, a network administrator can set the checked area boundaries up to 120% of the initially determined size. The area boundaries can be set based on IDS efficiency requirements and based on frequency of appearance of new threats. For example, if it is known that new threats appear daily, and a particular IDS, which works with Fast Ethernet at 100 Mbit/s can process an area in the stream that is 50% larger than the one currently defined, then it makes to increase the size of the area by 50%. According to one exemplary embodiment, the optimization system 300 can work with only one IDS 100 capable of collecting threat-related statistics. This is a closed feedback system, where the IDS 100 provides data (offsets and time of detection, for example) related to the threats detected within the checked areas of the data stream to the optimization system 300. The optimization system 300 then recalculates the areas to be checked by the IDS 100.

Figure 4:
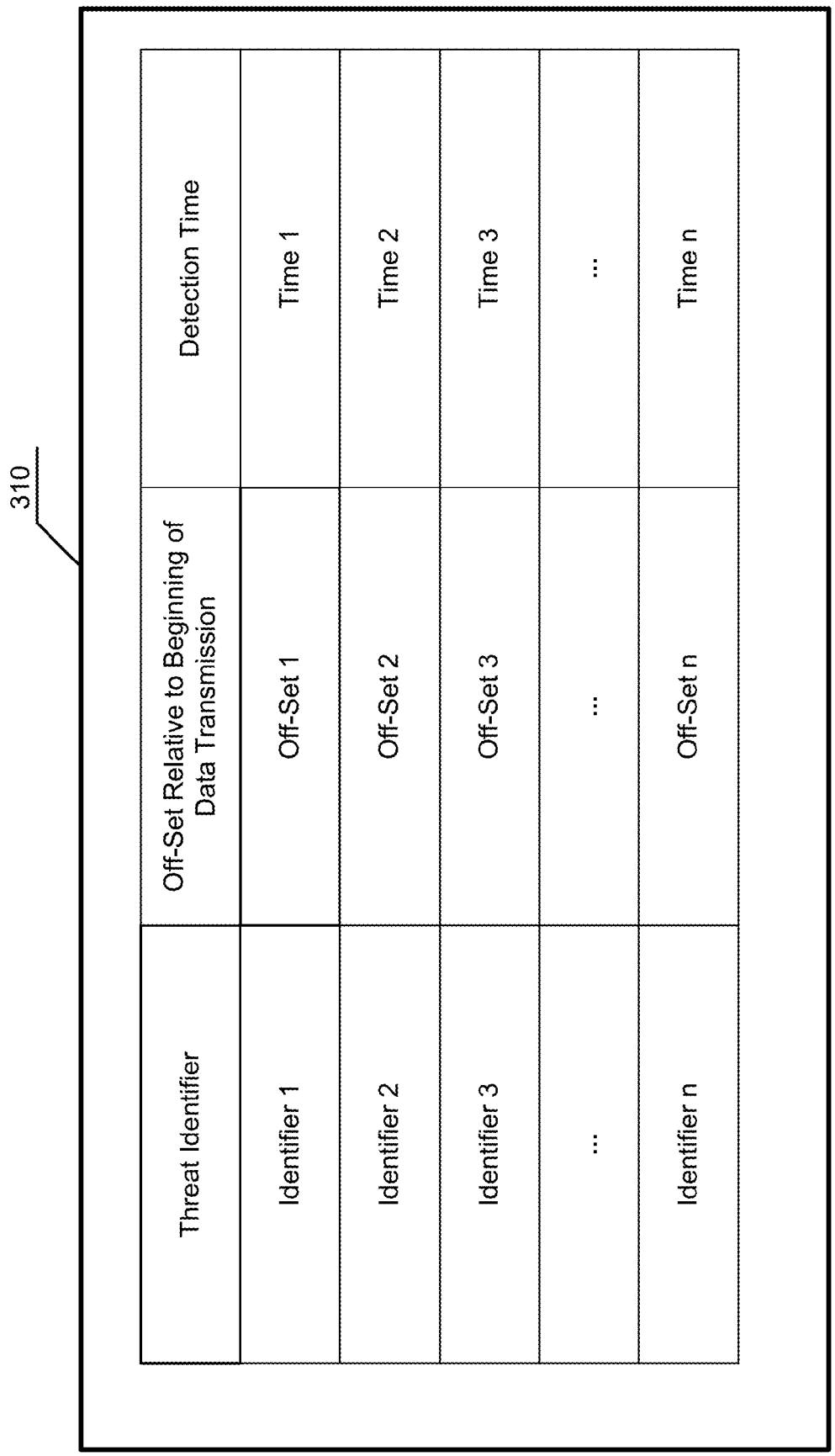
FIG. 4 illustrates an exemplary table of a statistics database.

FIG. 4 illustrates an exemplary table of a statistics database 310. Each threat detected by the system 330 is assigned an identifier. The threat identifier can be unique number, for example, a hash sum of the malware code executed by the threat. Each threat has an off-set value relative to the beginning of the data transmission (i.e., the beginning of the data stream). Also, a detection time is recorded for each threat.

For example, the statistics database 310 contains the following records:

| Threat Identifier | Threat off-set relative to beginning of the transmission | Detection Time |
| --- | --- | --- |
| Threat_1 | 94 Bytes | Dec. 07, 2010, 14:13:56 |
| Threat_2 | 166 Bytes | Dec. 10, 2010, 12:43:17 |
| Threat_3 | 56 Bytes | Jan. 04, 2011, 18:04:52 |
| Threat_4 | 26 Bytes | Aug. 06, 2011, 20:37:05 |

Determination of the areas to be checked by the unit 320 was performed on 2011-12-08, while the age threshold was set at one year. Then, the areas of the network data stream to be checked are set only for the off-sets of the threats with the identifiers "Threat_2", "Threat_3" and "Threat_4", because the age of the threat with identifier "Threat_1" exceeds the age threshold.

If the area determination is made after 12:43:17, 2011-12-10, the checked area will not include the off-set of the threat with the identifier "Threat_2". Note that separate checked areas can be set for the off-set of each threat (as shown in FIG. 2B) as well as one checked area for the entire stream until the last threat (as shown in FIG. 2C).

Figure 5:
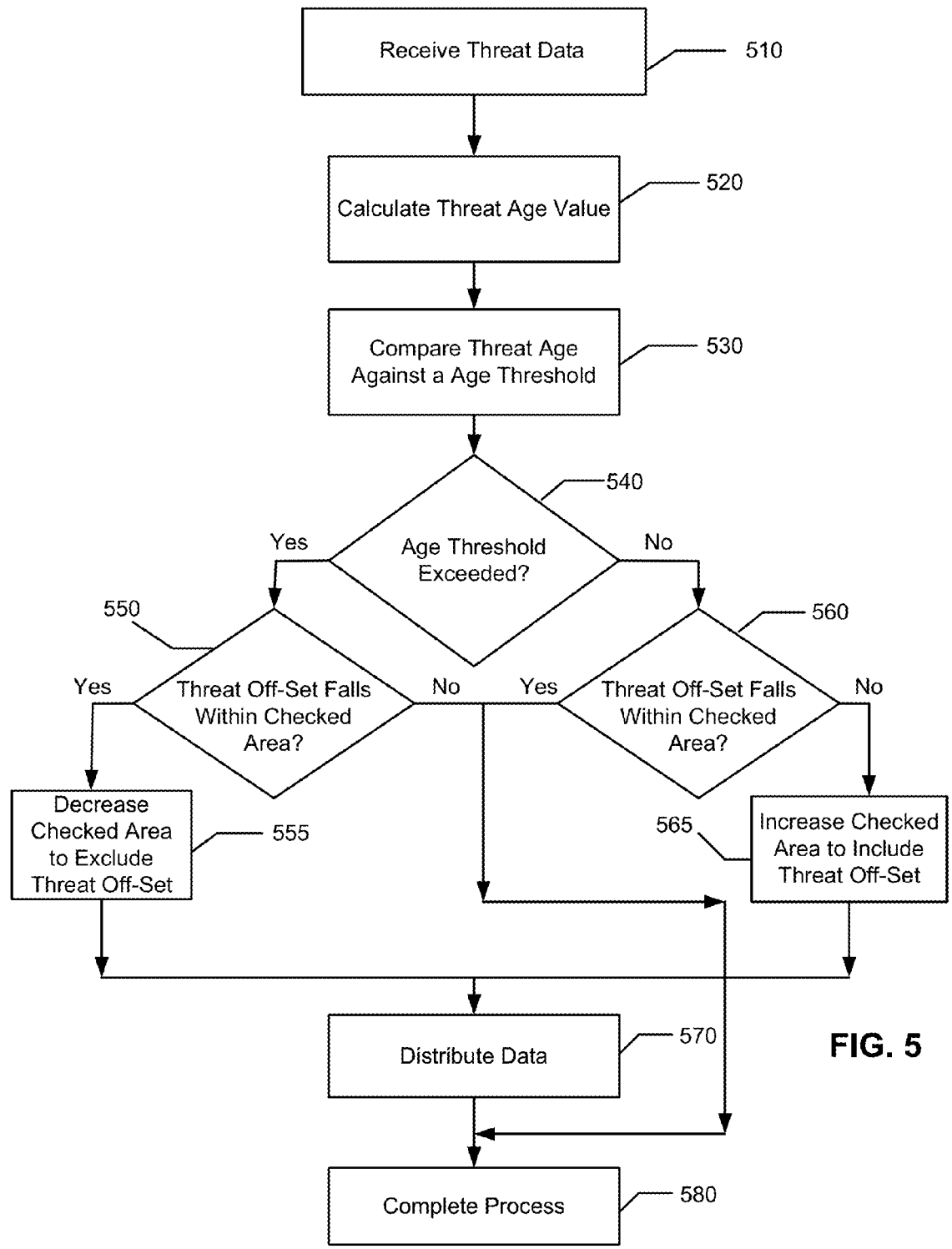
FIG. 5 illustrates a flow chart of a method for optimization of security processing of the network traffic data.

FIG. 5 illustrates a flow chart of a method for optimization of security processing of the network traffic. The exemplary flowchart reflects the situation when the statistics database 310 contains only one record reflecting a detected threat. For multiple threats the method is repeated. In step 510, the unit for determining checked areas 320 receives threat-related information from the statistics database 310.

In step 520, the unit for determining checked areas 320 calculates threat age (as the difference between the current time and the threat detection time). One example of the age is about 1 year. Selection of a large threshold (e.g., much larger than a year) would lead to consideration of threats that might not have been relevant for a long time—and the longer it has been since the threat was last detected, the less likely it is to be used again by the malware writers. On the other hand, selecting a low threshold can mean that some threats that might be reused periodically would not be detected. The threshold can be set, for example, based on a maximum time elapsed since last detection time of the threat, or based on a maximum amount of time elapsed between two instances of detection of the threat (and/or, for example, on the statistics collected by anti-virus vendors). Then, in step 530, the unit for determining checked areas 320 compares the calculated threat age against an age threshold. If the age threshold is exceeded in step 540, in step 550 the process determines if the threat off-set value falls within the checked area. If the threat off-set value falls within the checked area, the checked area is decreased to exclude the threat off-set in step 555.

Otherwise, the security monitoring process is completed in step 580. If the age threshold is not exceeded in step 540, in step 560 the process determines if the threat off-set value falls within the checked area. If the threat off-set value does not fall within the checked area, the checked area is increased to include the threat off-set in step 565.

Otherwise, the security monitoring process is completed in step 580. In step 570, the unit 320 distributes data reflecting the areas to be checked to the IDSs 100, which perform partial checking of the network traffic based on the determined checked areas. The entire process is repeated as soon as a new threat data is received in step 510.

Figure 6:
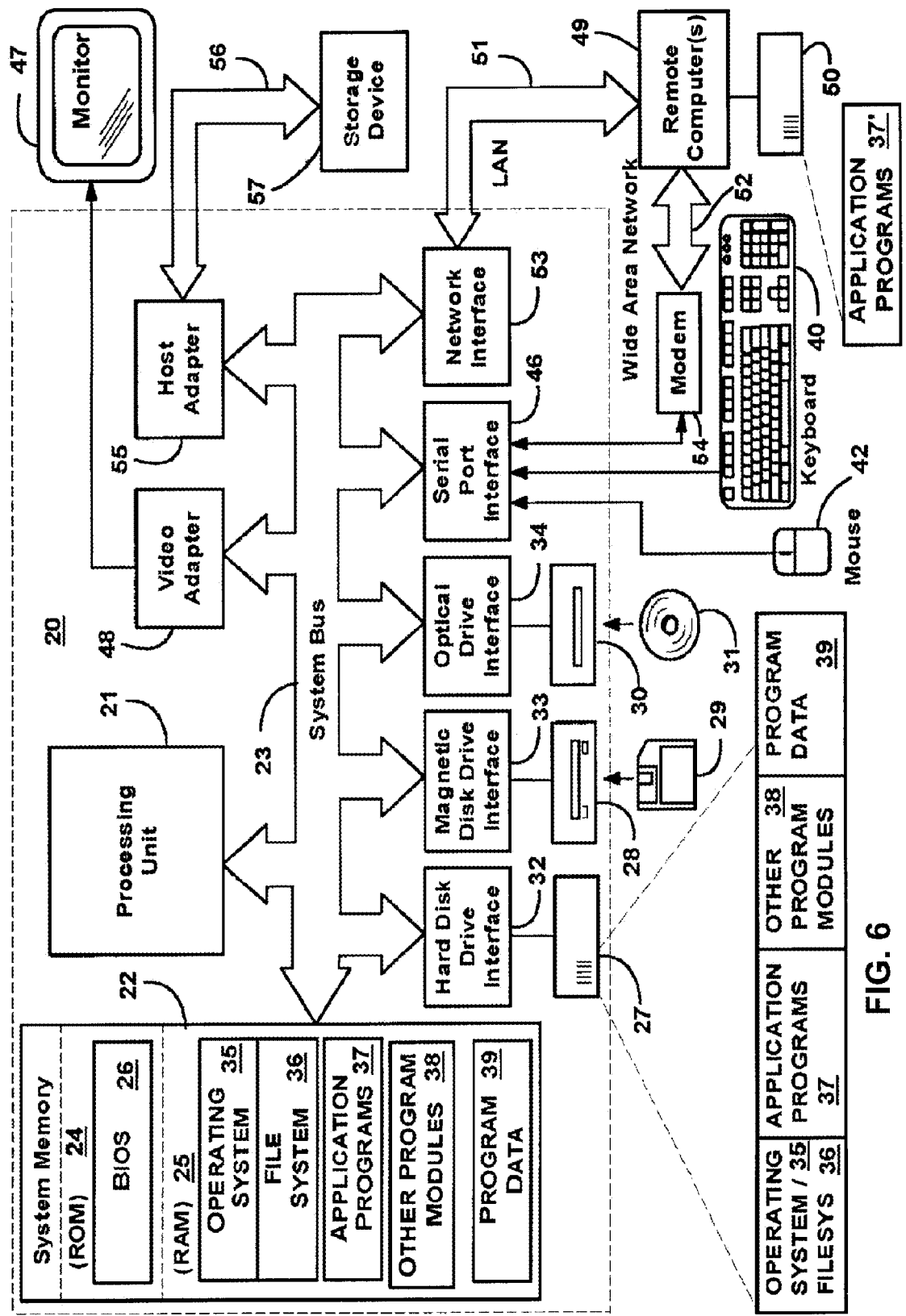
FIG. 6 illustrates a schematic of an exemplary computer system that can be used for implementation of the invention.

With reference to FIG. 6, an exemplary system for implementing the invention includes a general purpose computing device in the form of a computer/server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include a host adapter 55 that interfaces to a storage device 57 over a bus 56, and other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for optimization of security processing of the network traffic.

It should also be appreciated that various modifications, adaptations and alternative embodiments thereof may be made within the scope and spirit of the present invention. The invention is further defined by the following claims.

What is claimed is:

1. A computer-implemented system for security processing of a network data stream, the system comprising:
    a server;
    a plurality of client computers connected to the server over a network;
    at least one network intrusion detection system for processing a network data stream positioned between the server and the clients;
    at least one threat-related statistics collection system for collecting statistics of detected threats located between the server and the clients;
    a statistics database storing the threat-related statistics, including threat parameters, the database accessible by the statistics collection system;
    a unit for determining areas of the data stream to be checked connected to the statistics database, the areas representing portions of the data stream,
    wherein the threat-related statistics are stored in the database and the unit for determining areas of the data stream to be checked calculates the checked areas based on the threat-related statistics from the database,
    wherein, based on the threat-related statistics, the intrusion detection system (a) periodically changes a size of the checked areas of the data stream, or (b) changes the size of the checked areas of the data stream based on new detected threats, or (c) periodically changes a location of the checked areas of the data stream, and wherein a size of the checked area of the data stream is changed based on a threat age.

2. The system of claim 1, wherein the intrusion detection system selectively scans the checked areas of the data stream for threats.

3. The system of claim 1, wherein the intrusion detection system scans the entire network data stream.

4. The system of claim 1, wherein the intrusion detection system scans the checked areas of the data stream upon expiration of a pre-set time period.

5. The system of claim 1, wherein the threat parameters include a threat off-set value relative to beginning of the network data stream.

6. The system of claim 1, wherein the threat parameters include a threat detection date.

7. The system of claim 1, wherein the checked area is increased or decreased by the unit for determining areas of the data stream to be checked based on a threat off-set value parameter.

8. The system of claim 1, wherein a size of the checked area is increased or decreased by the unit for determining areas of the data stream to be checked based on a threat detection date.

9. The system of claim 1, wherein multiple areas in the data stream are checked at any one time for threats.

10. The system of claim 9, wherein a single area in the data stream is checked at any one time for threats.

11. The system of claim 1, wherein the network intrusion detection system and the threat-related statistics collection system are integrated into a single module.

12. The system of claim 1, wherein the threat-related statistics collection system uses honeypots for capturing threat information.

13. The system of claim 1, wherein a size of the checked area is dynamically expanded based on predefined limits.

14. A computer-implemented method for security processing of a network data stream, the method comprising:
scanning a data stream and detecting a threat;
storing threat-related data to a database;
receiving a threat-related data from the database;
determining a checked area of the data stream based on the threat-related data, the checked area representing a portion of the data stream;
calculating a threat age;
comparing the threat age against an age threshold;
decreasing the checked area of the data stream, if the threat age exceeds the age threshold and a location of the threat within the data stream falls inside the checked area; and
increasing the checked area of the data stream, if the threat age is below the age threshold and a location of the threat within the data stream falls outside the checked area;
distributing data indicating the checked area to a data stream processing device; and scanning the checked area for threats, and
wherein the data stream processing device (a) periodically changes a size of the checked areas of the data stream, or (b) changes the size of the checked areas of the data stream based on new detected threats, or (c) periodically changes a location of the checked areas of the data stream.

15. The method of claim 14, wherein the data stream processing device is an intrusion detection system.

16. The method of claim 14, wherein the location of the threat is determined by an off-set value from a beginning of the data stream.

17. The method of claim 14, wherein the threat-related data includes a threat identifier and a threat detection time.

18. The method of claim 17, wherein the threat age is determined as a difference between a checking time and a threat detection time.

19. The method of claim 14, wherein multiple areas in the data stream are checked at any one time for threats.

20. The method of claim 14, wherein a single area in the data stream is checked at any one time for threats.

21. The method of claim 14, wherein a size of the checked area is dynamically expanded based on predefined limits.

22. A system for security processing of a network data stream, the system comprising:
a processor;
a memory coupled to the processor;
a computer program logic stored in the memory and executed on the processor, the computer program logic implementing the steps of:
scanning a data stream and detecting a threat;
storing threat-related data to a database;
receiving a threat-related data from the database;
determining a checked area of the data stream based on the threat-related data, the checked area representing a portion of the data stream;
calculating a threat age;
comparing the threat age against an age threshold;
decreasing the checked area of the data stream, if the threat age exceeds the age threshold and a location of the threat within the data stream falls inside the checked area; and
increasing the checked area of the data stream, if the threat age is below the age threshold and a location of the threat within the data stream falls outside the checked area;
distributing data indicating the checked area to a data stream processing device; and scanning the checked area for threats, and
wherein the data stream processing device (a) periodically changes a size of the checked areas of the data stream, or (b) changes the size of the checked areas of the data stream based on new detected threats, or (c) periodically changes a location of the checked areas of the data stream.

* * * * *